United States Patent
Mori et al.

(10) Patent No.: US 9,286,850 B2
(45) Date of Patent: Mar. 15, 2016

(54) DISPLAY METHOD AND DISPLAY APPARATUS

(75) Inventors: Eijiro Mori, Tokyo (JP); Yusuke Sakai, Tokyo (JP); Kenichi Okada, Tokyo (JP); Haruo Oba, Tokyo (JP); Shingo Tsurumi, Tokyo (JP); Yuichi Iida, Tokyo (JP); Shinichi Hayashi, Tokyo (JP); Asako Tadenuma, Tokyo (JP); Junichi Tsukamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 109 days.

(21) Appl. No.: 13/393,970

(22) PCT Filed: Aug. 26, 2010

(86) PCT No.: PCT/JP2010/064481
§ 371 (c)(1),
(2), (4) Date: May 4, 2012

(87) PCT Pub. No.: WO2011/030674
PCT Pub. Date: Mar. 17, 2011

(65) Prior Publication Data
US 2012/0206340 A1    Aug. 16, 2012

(30) Foreign Application Priority Data
Sep. 11, 2009    (JP) .................................. 2009-210987

(51) Int. Cl.
*G08B 1/08*    (2006.01)
*G05B 23/02*    (2006.01)
(Continued)

(52) U.S. Cl.
CPC ............. *G09G 5/00* (2013.01); *H04N 21/4223* (2013.01); *H04N 21/4314* (2013.01);
(Continued)

(58) Field of Classification Search
CPC ...... H02J 13/00; G06K 9/00228; G06F 3/016
USPC ................... 340/635; 345/589, 173; 382/181, 382/185–189; 715/780, 863
See application file for complete search history.

(56) References Cited

U.S. PATENT DOCUMENTS 7,664,975 B2 *    2/2010    Oh et al. ........................ 713/320
7,782,405 B2 *    8/2010    Kerofsky ....................... 348/671
(Continued)

FOREIGN PATENT DOCUMENTS

EP    2 315 439 A1    4/2011
JP    07 212666    8/1995
(Continued)

OTHER PUBLICATIONS

Extended European Search Report issued Jun. 28, 2013 in Patent Application No. 10815271.1.
(Continued)

*Primary Examiner* — Mohamed Barakat
(74) *Attorney, Agent, or Firm* — Oblon, McClelland, Maier & Neustadt, L.L.P.

(57) ABSTRACT

To provide a display method capable of displaying the original power saving effect if a monitoring display of the power saving effect is not made when the monitoring display of the power saving effect is made. Provided is a display method including capturing an image in front of an image display surface included in a display apparatus that displays the image and detecting presence of a moving body positioned in front of the image display surface, deciding a power saving amount of the display apparatus including the power saving amount of the image display surface by using an analysis result of the presence or absence of a human face and a detection result of the moving body in the captured image, and deriving and displaying the actual power saving amount when no display is made on the image display surface on the image display surface when information about the power saving amount is displayed on the image display surface. Accordingly, when a monitoring display of a power saving effect is made, an original power saving effect if no monitoring display of the power saving effect is made can be displayed.

16 Claims, 7 Drawing Sheets

(51) Int. Cl.
*G09G 5/00* (2006.01)
*G06F 1/00* (2006.01)
*G06F 1/26* (2006.01)
*G06F 1/32* (2006.01)
*H04N 5/222* (2006.01)
*H04N 21/4223* (2011.01)
*H04N 21/431* (2011.01)
*H04N 21/4402* (2011.01)
*H04N 21/442* (2011.01)
*H04N 21/443* (2011.01)
*H04N 21/488* (2011.01)

(52) U.S. Cl.
CPC .... *H04N 21/4436* (2013.01); *H04N 21/44218* (2013.01); *H04N 21/440263* (2013.01); *H04N 21/4882* (2013.01); *G09G 2320/103* (2013.01); *G09G 2330/021* (2013.01)

(56) References Cited

U.S. PATENT DOCUMENTS

| | | | |
|---|---|---|---|
| 8,184,001 B2 * | 5/2012 | Kuris et al. | 340/539.3 |
| 2005/0154543 A1 * | 7/2005 | Shiraishi | 702/60 |
| 2008/0118152 A1 * | 5/2008 | Thorn et al. | 382/190 |
| 2009/0180004 A1 * | 7/2009 | Shioda | 348/231.2 |
| 2011/0135114 A1 | 6/2011 | Oba et al. | |

FOREIGN PATENT DOCUMENTS

| | | | |
|---|---|---|---|
| JP | 07212666 A * | 8/1995 | |
| JP | 09 046608 | 2/1997 | |
| JP | 09046608 A * | 2/1997 | |
| JP | 2005 044330 | 2/2005 | |
| JP | 2007 065766 | 3/2007 | |
| JP | 2008 009695 | 1/2008 | |
| JP | 2008009695 A * | 1/2008 | |
| JP | 2008 111886 | 5/2008 | |
| JP | 2008111886 A * | 5/2008 | |
| JP | 2008 301167 | 12/2008 | |
| JP | 2008301167 A * | 12/2008 | |
| JP | 2009 094723 | 4/2009 | |
| WO | WO 2008/062326 A1 | 5/2008 | |

OTHER PUBLICATIONS

U.S. Appl. No. 13/395,035, filed Mar. 8, 2012, Iida, et al.
International Search Report issued on Nov. 22, 2010 in PCT/JP10/64481 filed on Aug. 26, 2010.
Office Action issued Jan. 7, 2014 in Japanese Patent Application No. 2009-210987.

* cited by examiner

DISPLAY METHOD AND DISPLAY APPARATUS

TECHNICAL FIELD

The present invention relates to a display method and a display apparatus.

BACKGROUND ART

According to a survey by JEITA (Japan Electronics and Information Technology Industries Association), an average viewing time of the TV per day is 4.5 hours. With changes in life style today, however, it is known that the TV is not always watched for 4.5 hours.

For example, when the TV is viewed while making preparations to go to the company or to school or eating breakfast in the morning, the TV screen is not viewed uninterruptedly and eyes may be shifted or a conversation may be held with others when a program such a weather forecast that is sufficiently understood only with audio input is broadcast. Then, an interesting keyword broadcast in current affairs news or sports news may cause the viewing of the TV screen to start again, which is frequently observed behavior.

That is, so-called "viewing while doing something else" in which the TV is just turned on as a substitute for a clock in the morning and more recently, the sound of the TV is just heard while operating a PC (personal computer) in the evening is increasing as typical view forms of the TV. If such "viewing while doing something else" is done, power is uselessly consumed while the TV screen is turned on. Thus, a display apparatus that analyzes a user's viewing state by providing an image sensor in a periphery of the TV screen and detecting a lace by the image sensor and exercises power saving control optimal to the viewing state.

SUMMARY OF INVENTION

Technical Problem

If the level of a power saving effect being produced can be displayed in a screen while power saving control based on a result of face detection or moving body detection being exercised, demonstrations in shops or the like will be very effective and the appeal to customers coming to the shop will be significant. However, the power saving effect is displayed in a display panel or other display regions that are targets of power saving control and thus, a problem that it is difficult to make a monitoring display during power saving control in which the brightness of a panel is made darker or the panel is turned off. Moreover, the power saving effect is displayed in a display region to be a target of power saving control and thus, the monitoring display during power saving control in which the brightness of a panel is made darker or the panel is turned off leads to variations of results of the power saving effect and a problem of being unable to present the effect of actual power saving control correctly is also posed.

The present invention has been made in view of the above problems and an object thereof is to provide a novel and improved display method capable of displaying the original power saving effect if a monitoring display of the power saving effect is not made when the monitoring display of the power saving effect is made and a display apparatus.

Solution to Problem

According to the first aspect of the present invention in order to achieve the above-mentioned object, there is provided a display method including capturing an image in front of an image display surface of a display apparatus that displays the image and detecting presence of a moving body positioned in front of the image display surface, deciding a power saving amount of the display apparatus including the power saving amount of the image display surface by using an analysis result of the presence or absence of a human face and a detection result of the moving body in the captured image, and deriving and displaying the actual power saving amount when no display is made on the image display surface on the image display surface when information about the power saving amount is displayed on the image display surface.

When the information about the power saving amount is displayed on the image display surface, power consumption associated with a display thereof may be taken into account before the display.

When the information about the power saving amount is displayed on the image display surface, the captured image may also be displayed together.

When the captured image is displayed on the image display surface as the information about the power saving amount, the image may be displayed after a predetermined time passes after the image being captured.

When the information about the power saving amount is displayed on the image display surface, the information about the power saving amount may be displayed in a partial region of the image display surface.

When the information about the power saving amount is displayed on the image display surface, a light source used for an image display of the image display surface may be turned off in other regions than the partial region.

The information about the power saving amount may be displayed as a graph chronologically representing a power consumption ratio together with a numeric value.

When the information about the power saving amount is displayed on the image display surface, the power saving amount may be decided by limiting, among the faces contained in the captured image, to a specific face.

The specific face may be a face appearing in front of others.

The specific face may be a face of a person specified in advance.

If a face considered to be positioned away by a predetermined distance or more is judged to be present based on the analysis result of the presence or absence of the human face and the detection result of the moving body in the captured image, the face may be excluded from a decision target of the power saving amount.

According to the second aspect of the present invention in order to achieve the above-mentioned object, there is provided a display apparatus including an imaging unit that captures an image in front of an image display surface of a display apparatus that displays the image, a moving body detection unit that detects presence of a moving body positioned in front of the image display surface, a power saving amount decision unit that decides a power saving amount of the whole apparatus including the power saving amount of the image display surface by using the captured image of the imaging unit and a detection result of the moving body of the moving body detection unit, and a power saving amount display unit that derives the actual power saving amount when no display is made and displays the actual power saving amount as the power saving amount when information about the power saving amount and the captured image is displayed on the image display surface.

Advantageous Effects of Invention

According to the present invention, a novel and improved display method capable of displaying the original power saving effect if a monitoring display of the power saving effect is not made when the monitoring display of the power saving effect is made and a display apparatus can be provided.

DESCRIPTION OF EMBODIMENT

Figure 1:
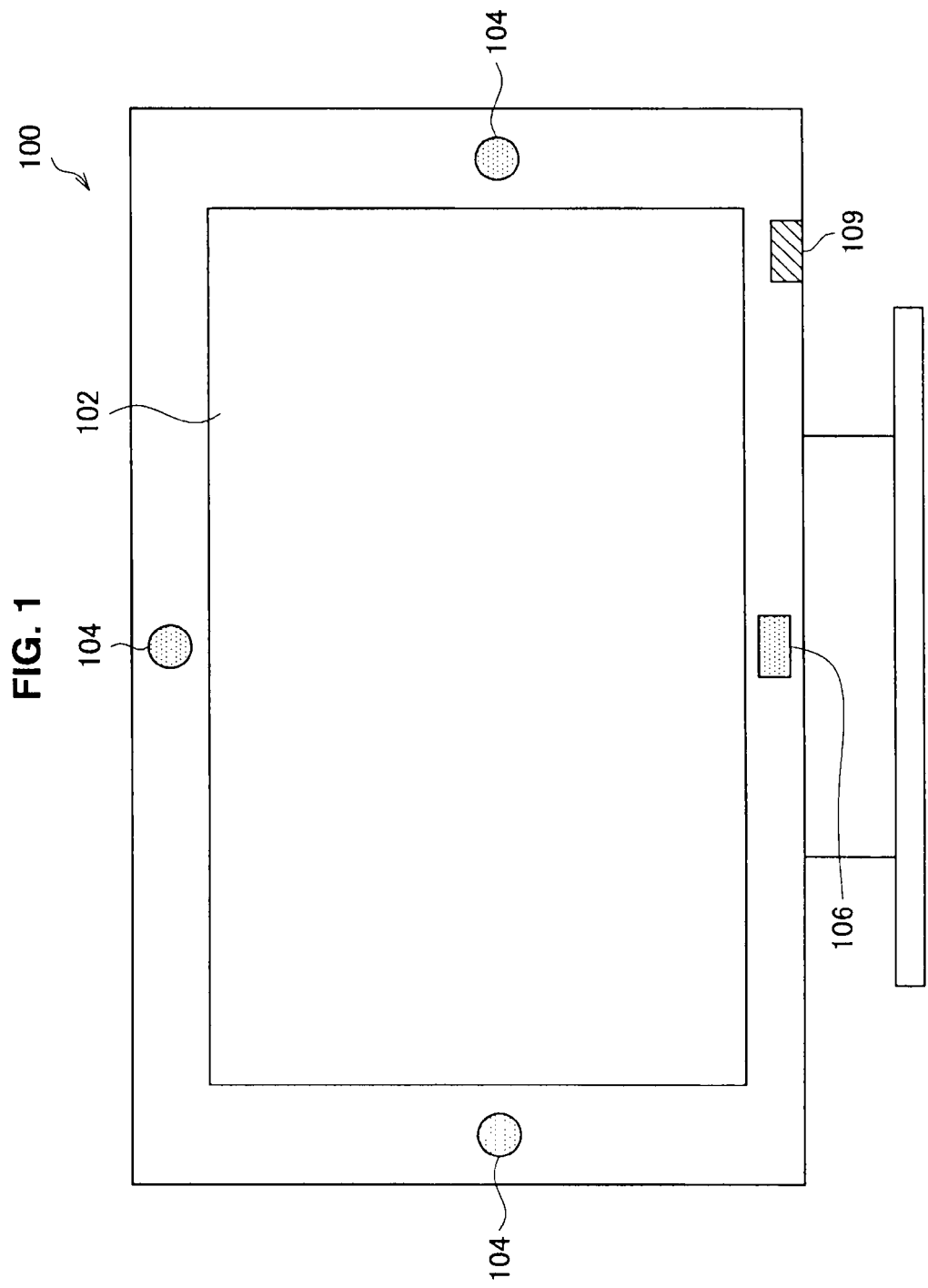
FIG. 1 is an explanatory view illustrating an appearance of an image display apparatus 100 according to an embodiment of the present invention.

Hereinafter, a preferred embodiment of the present invention will be described in detail with reference to the appended drawings. Note that, in this specification and the appended drawings, structural elements that have substantially the same function and structure are denoted with the same reference numerals, and repeated explanation of these structural elements is omitted.

The explanation will be made in the following order.
<1. Embodiment of the Present Invention>
[1-1. Configuration of Image Display Apparatus]
[1-2. Configuration of Control Unit]
[1-3. Configuration of Optimization Processing Effect Calculation Unit]
[1-4. Configuration of Power Saving Effect Calculation Unit]
[1-5. Display Method of Power Saving Effect]
[1-6. Power Saving Effect Calculation Method]
<2. Conclusion>

1. Embodiment of the Present Invention

[1-1. Configuration of Image Display Apparatus]

First, the configuration of an image display apparatus according to an embodiment of the present invention will be described. FIG. 1 is an explanatory view illustrating an appearance of the image display apparatus 100 according to an embodiment of the present invention. The appearance of the image display apparatus 100 according to an embodiment of the present invention will be described below by using FIG. 1.

As shown in FIG. 1, the image display apparatus 100 according to an embodiment of the present invention includes an imaging unit 104 that captures dynamic images in an upper center portion and left and right center portions of the display panel 102. The imaging unit 104 captures dynamic images in a direction in which the image display apparatus 100 displays still images or dynamic images in the display panel 102. The image display apparatus 100 according to the present embodiment analyzes an image captured by the imaging unit 104 to detect faces of users appearing in the image. The image display apparatus 100 is characterized in that the image display apparatus 100 changes an internal operation state depending on whether a user's face is contained in dynamic images captured by the imaging unit 104.

The image display apparatus 100 according to an embodiment of the present invention also includes a sensor 106 in a lower center portion of the display panel 102. The sensor 106 detects the presence or absence of any human in front of the image display apparatus 100. The image display apparatus 100 is also characterized in that the image display apparatus 100 changes the internal operation state depending on whether any human is present in front of the image display apparatus 100.

In FIG. 1, the image display apparatus 100 includes the imaging unit 104 that captures dynamic images in three locations around the display panel 102 of images, but the location of image input capturing dynamic images in the present invention is not limited to such an example and, for example, a separate apparatus from the image display apparatus 100 may be provided to capture dynamic images by the apparatus after being connected to the image display apparatus 100. The number of image input units is not limited to three and two or less or four or more image input units may be provided to capture images. Further, the number of the sensors 106 is not limited to one and two or more sensors may be provided to detect the presence or absence of humans.

The appearance of the image display apparatus 100 according to an embodiment of the present invention has been described by using FIG. 1. Next, the configuration of the image display apparatus 100 according to an embodiment of the present invention will be described.

Figure 2:
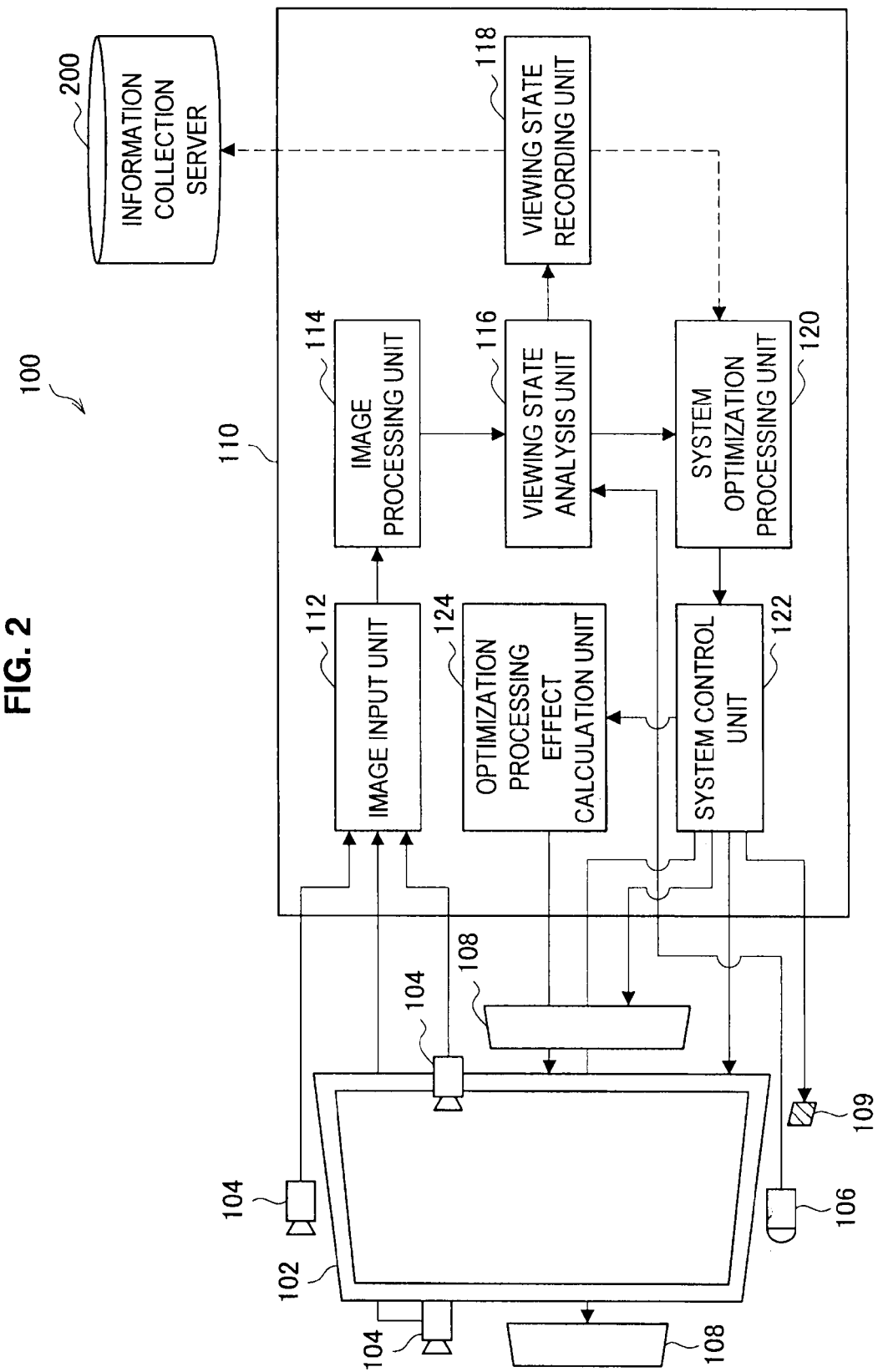
FIG. 2 is an explanatory view showing the configuration of the image display apparatus 100 according to an embodiment of the present invention.

FIG. 2 is an explanatory view showing the configuration of the image display apparatus 100 according to an embodiment of the present invention. The configuration of the image display apparatus 100 according to an embodiment of the present invention will be described below by using FIG. 2.

As shown in FIG. 2, the image display apparatus 100 according to an embodiment of the present invention includes the display panel 102, the imaging unit 104, the sensor 106, a speaker 108, and the control unit 110.

The control unit 110 includes an image input unit 112, an image processing unit 114, a viewing state analysis unit 116, a viewing state recording unit 118, a system optimization processing unit 120, a system control unit 122, and the optimization processing effect calculation unit 124.

The display panel 102 displays still images or dynamic images based on a panel driving signal. In the present embodiment, the display panel 102 displays still images or dynamic images by a liquid crystal display. In the present invention, it is needless to say that the display panel 102 is not limited to such an example. The display panel 102 may be a panel that displays still images or dynamic images by a self-light-emitting display device like an organic EL.

The imaging unit 104 is provided, as described above, in the upper center portion and left and right center portions of the display panel 102 that displays still images or dynamic images and captures dynamic images in the direction in which the image display apparatus 100 displays dynamic images in the display panel 102 when dynamic images are displayed in the display panel 102 after a panel driving signal being supplied to the display panel 102. The imaging unit 104 may capture dynamic images by a CCD (Charge Coupled Device) image sensor or capture dynamic images by a CMOS (Complementary Metal Oxide Semiconductor) image sensor. Dynamic images captured by the imaging unit 104 are sent to the control unit 110.

The sensor 106 is provided, as described above, in the lower center portion of the display panel 102 that displays still images or dynamic images and detects the presence or absence of any human in front of the image display apparatus 100. If a human is present in front of the image display apparatus 100, the sensor 106 can detect the distance between the image display apparatus 100 and the human. A detection result and distance information by the sensor 106 are sent to the control unit 110. The speaker 108 outputs a voice based on an audio output signal.

The control unit 110 controls the operation of the image display apparatus 100. Each unit of the control unit 110 will be described below.

The image input unit 112 receives dynamic images captured by the imaging unit 104. Dynamic images received by the image input unit 112 are sent to the image processing unit 114, where dynamic images are used for image processing by the image processing unit 114.

The image processing unit 114 performs various kinds of image processing on dynamic images sent from the image input unit 112 and captured by the imaging unit 104. The image processing performed by the image processing unit 114 includes detection processing of moving bodies contained dynamic images captured by the imaging unit 104, detection processing of the number of humans contained dynamic images, and detection processing of faces and expressions of faces contained dynamic images. Results of various kinds of image processing by the image processing unit 114 are sent to the viewing state analysis unit 116, where the results are used to analyze the presence or absence of humans viewing the image display unit 100 and the state of viewing humans.

A technology described in, for example, Japanese Patent Application Laid-Open No. 2007-65766 or Japanese Patent Application Laid-Open No. 2005-44330 may be used for face detection processing by the image processing unit 114 that detects faces contained in an image. The face detection processing will briefly be described below.

To detect a user face from an image, the face position, face size, and face orientation in the supplied image are first detected. If the face position and size are detected, a face image portion can be cut out from the image. Based on the cutout face image and information about the face orientation, featuring portions of the face (face feature positions), for example, eyelashes, eyes, the nose, and the mouth are detected. For the detection of the face feature positions, for example, the method called AAM (Active Appearance Models) may be applied to detect feature positions.

If the face feature positions are detected, a local feature amount is calculated for each of the detected face feature positions. By calculating local feature amounts and storing calculated local feature amounts together with a face image, faces can be identified from an image input from the image input unit 112. The technology described in, for example, Japanese Patent Application Laid-Open No. 2007-65766 or Japanese Patent Application Laid-Open No. 2005-44330 can be used for the identification method of face and a detailed description thereof is omitted. Based on a face image or face feature positions, whether a face appearing in a supplied image is male or female, or an adult or a child can also be distinguished.

The viewing state analysis unit 116 receives results of various kinds of image processing by the image processing unit 114 and detection results and distance information detected by the sensor 106 and carries out analyses of the presence or absence of persons viewing images displayed by the image display apparatus 100 and the state of viewing persons by using results of various kinds of image processing by the image processing unit 114 and detection results and distance information detected by the sensor 106. With the analyses of the presence or absence of persons and the state of viewing persons being carried out by viewing state analysis unit 116, the image display apparatus 100 can lower the brightness of the display panel 102 depending on the presence or absence of persons viewing the image display apparatus 100 or control the orientation of the display panel 102. Analysis results by analysis processing of the viewing state analysis unit 116 are sent to the viewing state recording unit 118, the system optimization processing unit 120, and the optimization processing effect calculation unit 124.

The viewing state recording unit 118 records analysis results obtained by analysis processing of the viewing state analysis unit 116. Analysis results by the viewing state analysis unit 116 recorded in the viewing state recording unit 118 are used for system optimization processing by the system optimization processing unit 120. Analysis results by the viewing state analysis unit 116 recorded in the viewing state recording unit 118 may also be sent to an external information collection server 200.

The system optimization processing unit 120 is an example of a power saving amount decision unit of the present invention and calculates system control information to perform system optimization processing for each device of the image display apparatus 100 by using analysis results obtained by analysis processing of the viewing state analysis unit 116. The system optimization processing for each device of the image display apparatus 100 includes power control of the image display apparatus 100, brightness control of the display panel 102, orientation control of the display panel 102, control of display content of the display panel 102, and sound volume control of sound output from the speaker 108. The system control information calculated by the system optimization processing unit 120 is sent to the system control unit 122.

The system control unit 122 performs system optimization processing for each device of the image display apparatus 100 based on the system control information calculated by the system optimization processing unit 120. More specifically, the system control unit 122 performs the brightness control of the display panel 102, orientation control of the display panel 102, control of display content of the display panel 102, and sound volume control of sound output from the speaker 108 based on the system control information calculated by the system optimization processing unit 120 and sends the control information for each device to the optimization processing effect calculation unit 124.

The optimization processing effect calculation unit 124 is an example of a power saving amount display unit of the present invention and acquires control information for each device of the image display apparatus 100. When control information is acquired, the optimization processing effect calculation unit 124 calculates an effect of optimization processing and presents a calculation result of the effect of the optimization processing to a portion or all of the display panel 102.

The configuration of the image display apparatus 100 according to an embodiment of the present invention has been described by using FIG. 2. Thus, the image display apparatus 100 according to an embodiment of the present invention analyzes the viewing state of users through the imaging unit 104 and the sensor 106. In the past, imaging processing is performed by the imaging unit 104 and the viewing state of users is analyzed only by face detection processing that judges whether any face is contained in an image captured by the imaging unit 104. However, if the viewing state of users is analyzed only by the face detection processing, a problem is caused that the display is switched off by assuming no viewing even if the display apparatus is desired to be still used such as when it is difficult to detect the user's face or the user look away for a fixed time. Moreover, when compared with moving body detection processing by a sensor, a relatively longer image processing time is needed for face detection processing and thus, a delay in reaction until an image is displayed after a user comes to a display apparatus for viewing arises in an environment in which the calculation speed or resources are limited.

On the other hand, apparatuses that exercise power saving control by detecting a moving body or user operation through a pyroelectric infrared element or other sensor and analyzing the viewing state of user are available, but if the user does not move and continues to view, a problem is caused that the display is switched off by assuming that there is no user. The time until the power saving control is started is delayed to avoid a malfunction, resulting in a reduced power saving effect.

Thus, the image display apparatus 100 according to an embodiment of the present invention combines face detection processing on an image captured by the imaging unit 104 and moving body detection processing by the sensor 106 to be able to analyze the viewing state of users more effectively.

Next, the configuration of the control unit 110 contained in the image display apparatus 100 according to an embodiment of the present invention will be described in more detail.

[1-2. Configuration of Control Unit]

Figure 3:
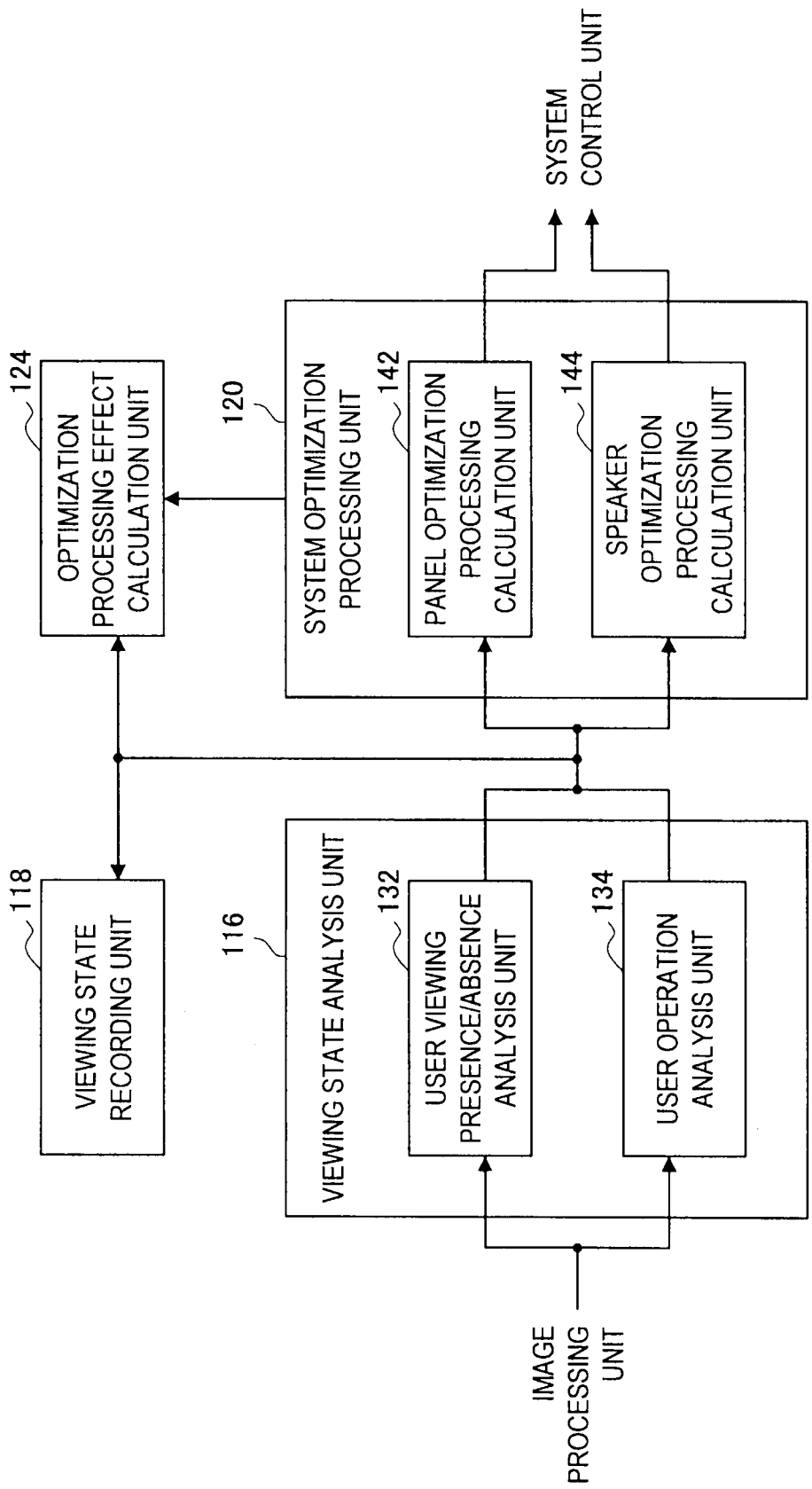
FIG. 3 is an explanatory view illustrating the configuration of a control unit 110 contained in the image display apparatus 100 according to an embodiment of the present invention.

FIG. 3 is an explanatory view illustrating the configuration of the control unit 110 contained in the image display apparatus 100 according to an embodiment of the present invention. FIG. 3 illustrates the configuration of the viewing state analysis unit 116 and the system optimization processing unit 120 contained in the control unit 110. The configuration of the viewing state analysis unit 116 and the system optimization processing unit 120 will be described below by using FIG. 3.

As shown in FIG. 3, the viewing state analysis unit 116 includes a user viewing presence/absence analysis unit 132 and a user operation analysis unit 134. The system optimization processing unit 120 includes a panel optimization processing calculation unit 142 and a speaker optimization processing calculation unit 144.

The user viewing presence/absence analysis unit 132 receives results of various kinds of image processing by the image processing unit 114 and detection results and distance information detected by the sensor 106 and detects the presence or absence of humans viewing the image display apparatus 100 and the orientation and size of faces of humans viewing the image display apparatus 100 by using results of various kinds of image processing by the image processing unit 114 and detection results and distance information detected by the sensor 106.

The user operation analysis unit 134 receives results of various kinds of image processing by the image processing unit 114 and detection results and distance information detected by the sensor 106 and analyzes the presence or absence of humans viewing the image display apparatus 100 from the chronological and spatial state and history of user operations by using results of various kinds of image processing by the image processing unit 114 and detection results and distance information detected by the sensor 106.

A captured image, face detection information (for example, information such as center coordinates [a1, b1], the face size [w1, h1], and the face orientation [i1]) for each of users using the image display apparatus 100 in the captured image, and moving body detection information (for example, information such as center coordinates [c1, d1] and the face region size [s1]) are sent from the image processing unit 114 to the viewing state analysis unit 116. In the viewing state analysis unit 116, analysis processing of the presence of absence of humans viewing the image display apparatus 100 using information sent from the image processing unit 114 is performed by the user viewing presence/absence analysis unit 132 and the user operation analysis unit 134.

The panel optimization processing calculation unit 142 calculates processing (power saving realization processing) capable of realizing optimal power saving in the display panel 102 by using results of analysis processing by the user viewing presence/absence analysis unit 132 and the user operation analysis unit 134. The processing capable of realizing optimal power saving in the display panel 102 is, for example, processing that controls the brightness of the display panel 102 in accordance with the presence or absence of humans viewing the image display apparatus 100 and the time in which no human viewing the image display apparatus 100 is present. The power saving realization processing calculated by the panel optimization processing calculation unit 142 is sent to the system control unit 122 and used for power saving processing by the display panel 102.

The speaker optimization processing calculation unit 144 calculates processing (power saving realization processing) capable of realizing optimal power saving in the speaker 108 by using results of analysis processing by the user viewing presence/absence analysis unit 132 and the user operation analysis unit 134. The processing capable of realizing optimal power saving in the speaker 108 is, for example, processing that controls the sound volume of the speaker 108 in accordance with the presence or absence of humans viewing the image display apparatus 100 and the time in which no human viewing the image display apparatus 100 is present. The power saving realization processing calculated by the speaker optimization processing calculation unit 144 is sent to the system control unit 122 and used for power saving processing by the speaker 108.

The configuration of the viewing state analysis unit 116 and the system optimization processing unit 120 has been described by using FIG. 3. Next, the configuration of the optimization processing effect calculation unit 124 will be described.

[1-3. Configuration of Optimization Processing Effect Calculation Unit]

Figure 4:
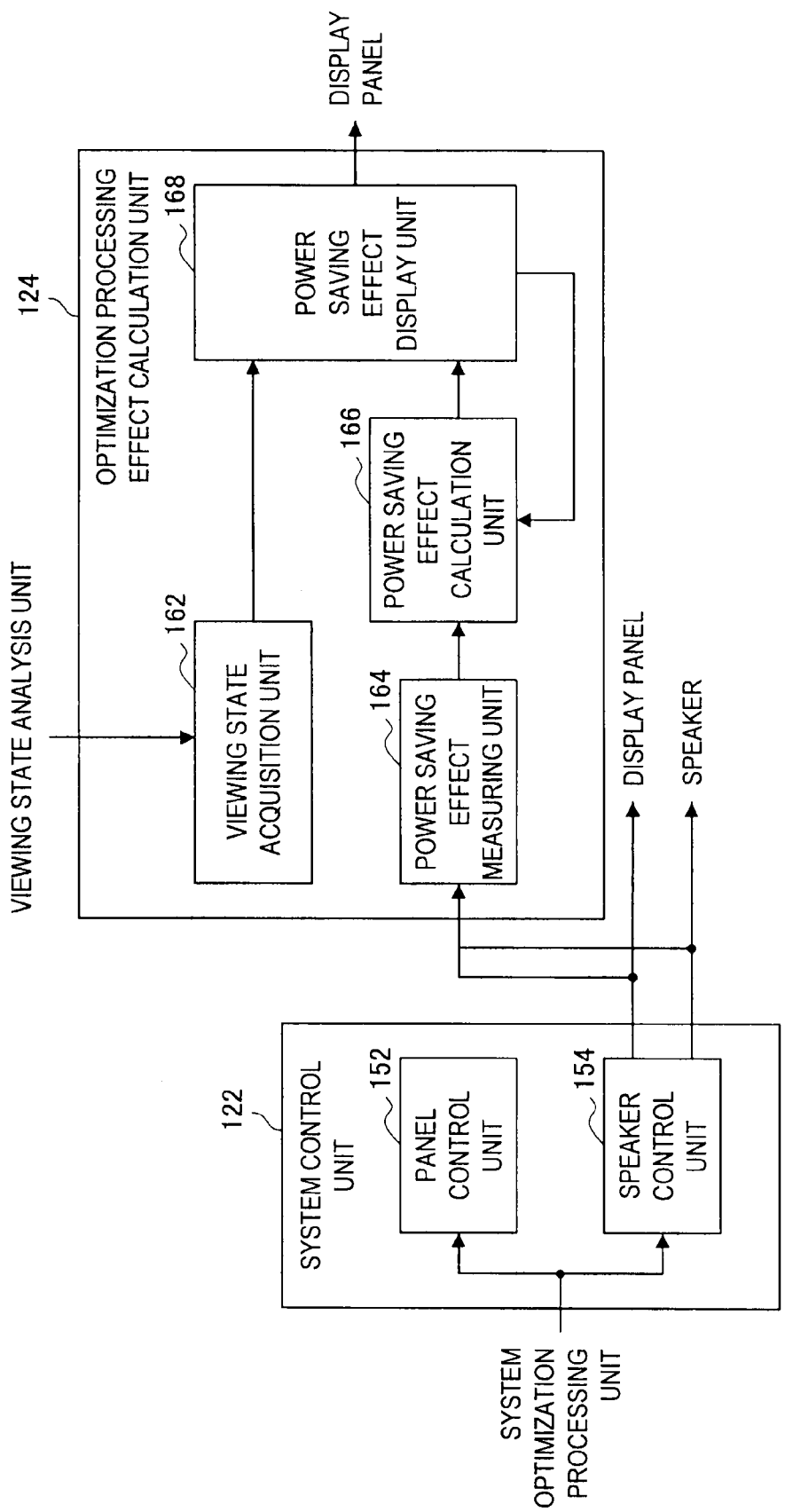
FIG. 4 is an explanatory view showing the configuration of an optimization processing effect calculation unit 124 contained in the control unit 110.

FIG. 4 is an explanatory view showing the configuration of the optimization processing effect calculation unit 124 contained in the control unit 110. FIG. 4 also shows the configuration of the system control unit 122 along with the configuration of the optimization processing effect calculation unit 124. The configuration of the optimization processing effect calculation unit 124 contained in the control unit 110 will be described below by using FIG. 4.

As shown in FIG. 4, the system control unit 122 contained in the control unit 110 includes a panel control unit 152 and a speaker control unit 154 and the optimization processing effect calculation unit 124 contained in the control unit 110 includes a viewing state acquisition unit 162, a power saving effect measuring unit 164, the power saving effect calculation unit 166, and a power saving effect display unit 168.

The viewing state acquisition unit 162 receives an image captured by the imaging unit 104 from the viewing state analysis unit 116 and analysis result information of the viewing state analyzed by the viewing state analysis unit 116. The image captured by the imaging unit 104 and analysis result information of the viewing state analyzed by the viewing state analysis unit 116 received by the viewing state acquisition unit 162 are sent from the viewing state acquisition unit 162 to the power saving effect display unit 168.

The power saving effect measuring unit 164 measures power consumption and the power control value of each device of the image display apparatus 100 by receiving information about changes by power saving control when the power saving control of each device is exercised by the system control unit 122. The power consumption and the power control value of each device measured by the power saving effect measuring unit 164 are sent to the power saving effect calculation unit 166.

The power saving effect calculation unit 166 calculates a power saving effect due to power saving of the image display apparatus 100 by using the power consumption and the power control value of each device measured by the power saving effect measuring unit 164. The power saving effect calculated by the power saving effect calculation unit 166 is converted into a form such as a graph or numeric values that appeals to vision and sent to the power saving effect display unit 168. If, for example the power saving effect calculation unit 166 calculates that power consumption of the image display apparatus 100 is reduced by 30% due to power saving processing of the image display apparatus 100, the information of 30% is sent to the power saving effect display unit 168.

The power saving effect display unit 168 receives information about the power saving effect calculated by the power saving effect calculation unit 166 and converted into a form that appeals to vision. Information received by the power saving effect display unit 168 from the power saving effect calculation unit 166 is sent to the display panel 102 where the power saving effect is displayed. The power saving effect display unit 168 also gives feedback on information about the display of the power saving effect to the power saving effect calculation unit 166 to cause the power saving effect calculation unit 166 to determine a difference from an original power consumption value by the power saving effect being actually displayed in the display panel 102.

The configuration of the optimization processing effect calculation unit 124 contained in the control unit 110 has been described by using FIG. 4. Next, the configuration of the power saving effect calculation unit 166 contained in the optimization processing effect calculation unit 124 will be described.

[1-4. Configuration of Power Saving Effect Calculation Unit]

Figure 5:
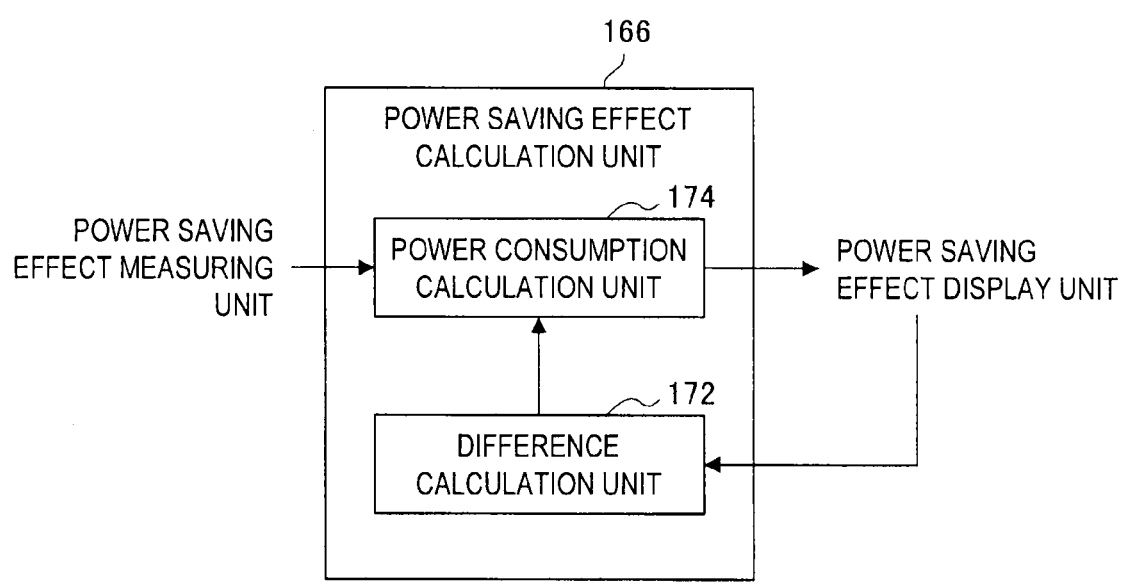
FIG. 5 is an explanatory view showing the configuration of a power saving effect calculation unit 166 contained in the optimization processing effect calculation unit 124.

FIG. 5 is an explanatory view showing the configuration of the power saving effect calculation unit 166 contained in the optimization processing effect calculation unit 124. The configuration of the power saving effect calculation unit 166 contained in the optimization processing effect calculation unit 124 will be described below by using FIG. 5.

As shown in FIG. 5, the power saving effect calculation unit 166 contained in the optimization processing effect calculation unit 124 includes a difference calculation unit 172 and a power consumption calculation unit 174.

The difference calculation unit 172 receives information from the power saving effect display unit 168 and calculates a power consumption value associated with the display of the power saving effect in the display panel 102 from the received information. The information sent from the power saving effect display unit 168 to the difference calculation unit 172 is, for example, information about the presence or absence of the power saving effect display on the display panel 102, the ratio of the display region of the power saving effect in the display panel 102 when the power saving effect is displayed, the panel characterization factor of the display panel 102 for partial display and the like. Information of the power consumption value calculated by the difference calculation unit 172 and associated with the display of the power saving effect in the display panel 102 is sent to the power consumption calculation unit 174.

The panel characterization factor is a factor to calculate power consumption in other regions caused by the display of the power saving effect in a partial region of the display panel 102. For example, the panel characterization factor decreases if the display panel 102 displays an image by a partial driving LED method and the panel characterization factor increases if the display panel 102 displays an image by a simultaneous lighting method of backlight like a liquid crystal display.

The power consumption calculation unit 174 calculates an actual power consumption value of the image display apparatus 100 when the power saving effect is displayed in the display panel 102 by using the power consumption and the power control value of each device measured by the power saving effect measuring unit 164 and the power consumption value calculated by the difference calculation unit 172 and associated with the display of the power saving effect in the display panel 102. It is only the power consumption value of the display panel 102 that affects the actual power consumption value of the image display apparatus 100 when the power saving effect is displayed in the display panel 102. Therefore, the power consumption calculation unit 174 sets the value obtained by subtracting the power consumption value calculated by the difference calculation unit 172 from the power consumption value of the display panel 102 measured by the power saving effect measuring unit 164 as the actual power consumption of the display panel 102. Information of the actual power consumption value of the image display apparatus 100 calculated by the power consumption calculation unit 174 is sent to the power saving effect display unit 168.

The configuration of the power saving effect calculation unit 166 contained in the optimization processing effect calculation unit 124 has been described by using FIG. 5.

[1-5. Display Method of Power Saving Effect]

Next, the display method of a power saving effect in the display panel 102 of the image display apparatus 100 according to an embodiment of the present invention will be described. Various methods can be considered for the display of a power saving effect in the display panel 102 and it is needless to say that the display method of the power saving effect is not limited to the method shown below in the present invention.

For example, time variations of the power saving effect that vary with the power saving control may be displayed in graphical form in the display panel 102. More specifically, variations in the past few minutes may be updated every few minutes to display variations in the form of a bar graph or line graph.

Alternatively, for example, the power saving effect varying with the power saving control may be displayed in the display panel 102 as an efficiency value in a fixed time. More specifically, the power saving effect (reduced power consumption) in the past few minutes may be displayed as a ratio (%) to the consumption when no power saving control is exercised.

For example, an image captured by the imaging unit 104 and result information of the image analysis processing by the viewing state analysis unit 116 may be superimposed and displayed in the display panel 102. More specifically, video of a user captured by the imaging unit 104 from the image display apparatus 100 may be superimposed on the power saving effect display in which a detection frame or additional information about an analysis result is displayed in a face portion of the user in the image.

Figure 6A:
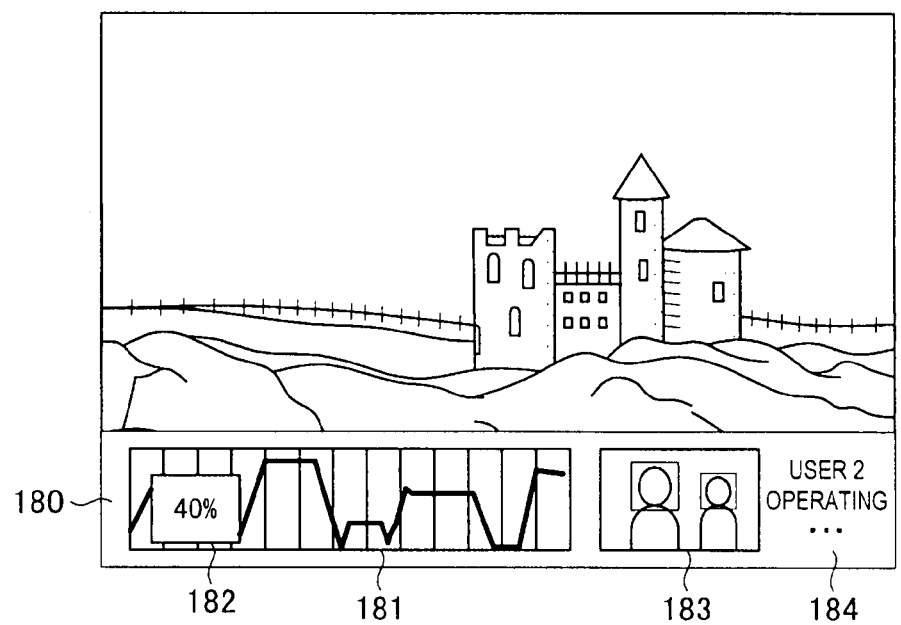
FIG. 6A is an explanatory view showing a display example of a power saving effect displayed by being superimposed on a screen displayed by a display panel 102.
Figure 6B:
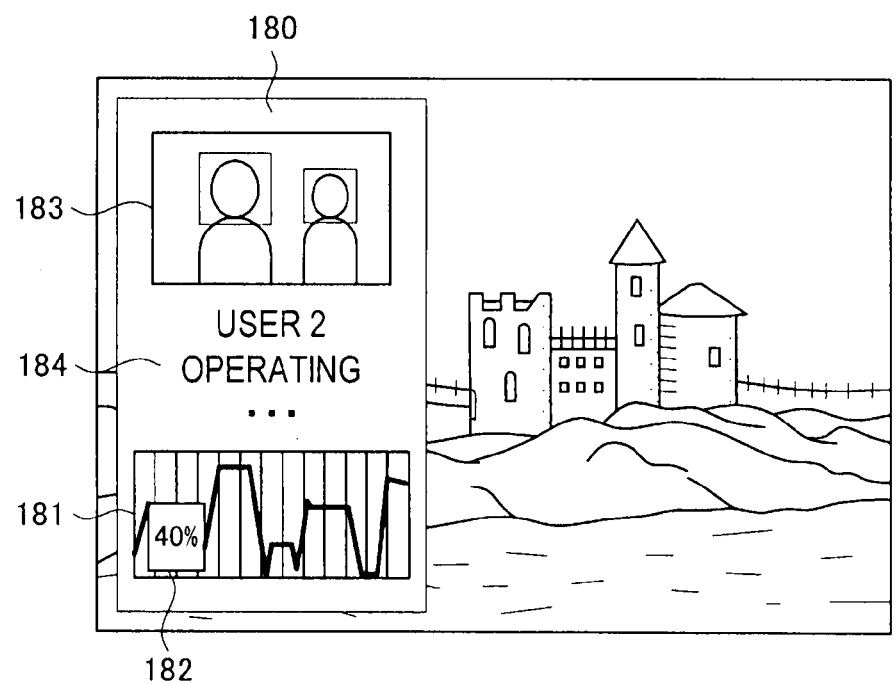
FIG. 6B is an explanatory view showing a display example of the power saving effect displayed by being superimposed on the screen displayed by the display panel 102.

FIGS. 6A and 6B are explanatory views showing display examples of the power saving effect displayed by the optimization processing effect calculation unit 124 by being superimposed on the screen displayed by the display panel 102. FIG. 6A shows a case of displaying, in a power saving effect display region 180 provided in a region of about ⅓ in a lower part of the screen, power saving effect graph information 181 in which the power saving effect is displayed as a line graph, power saving effect numeric value information 182 in which the power saving effect is displayed as a numeric value, captured image information 183 in which images captured by the imaging unit 104 and result information of image analysis processing by the viewing state analysis unit 116 are displayed, and viewing state additional information 184 in which results of image analysis processing by the viewing state analysis unit 116, the presence or absence of viewing users and the like are displayed.

In FIG. 6B, on the other hand, the power saving effect graph information 181, the power saving effect numeric value information 182, the captured image information 183, and the viewing state additional information 184 are displayed in the power saving effect display region 180 provided in a region of about ⅓ in a left part of the screen.

When, as shown in FIGS. 6A and 6B, the power saving effect display region 180 is displayed in a portion of the display panel 102, if the image display apparatus 100 can turn off a portion of a light source used for the image display of the display panel 102, the light source may be turned off for the region where the power saving effect display region 180 is not displayed. An example of the device that can turn off a portion of the light source used for the image display is an LED (Light Emitting Diode).

By displaying the power saving effect display region 180 in a portion of the display panel 102 as described above, the power saving effect associated with power saving processing of the image display apparatus 100 can visually be grasped.

[1-6. Power Saving Effect Calculation Method]

Subsequently, the power saving effect calculation method for the image display apparatus 100 according to an embodiment of the present invention will be described.

Figure 7:
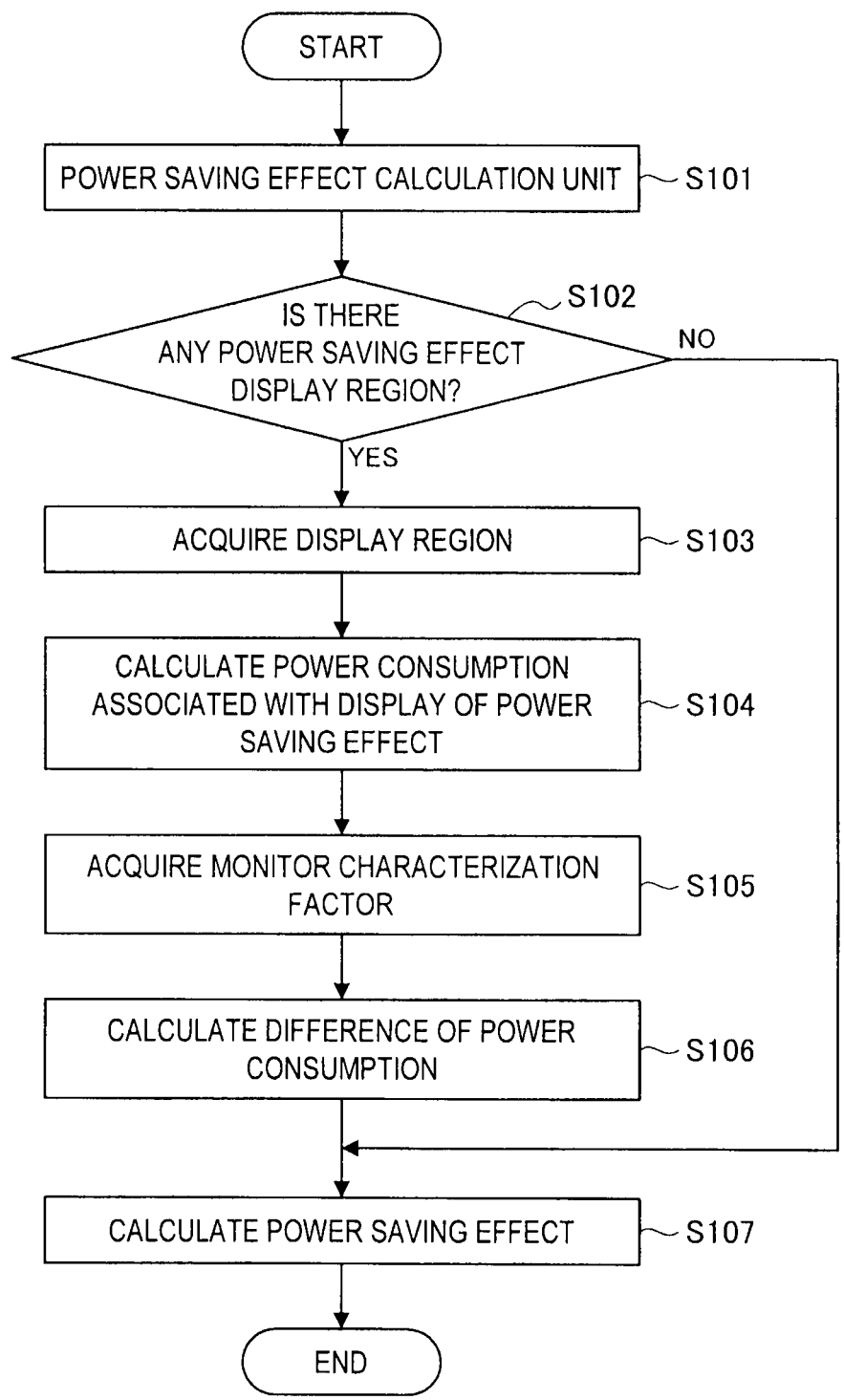
FIG. 7 is a flow chart showing a power saving effect calculation method for the image display apparatus 100 according to an embodiment of the present invention.

FIG. 7 is a flow chart showing the power saving effect calculation method for the image display apparatus 100 according to an embodiment of the present invention. The power saving effect calculation method for the image display apparatus 100 according to an embodiment of the present invention will be described below by using FIG. 7.

To calculate the power saving effect in the image display apparatus 100, first the power saving effect calculation unit 166 contained in the optimization processing effect calculation unit 124 calculates the power saving effect by using measured values of power consumption by the image display apparatus 100 (step S101). After the power saving effect being calculated by the power saving effect calculation unit 166 using measured values of power consumption of the image display apparatus 100, it is subsequently judged whether the power saving effect display region 180 is displayed in a portion of the display panel 102 when the power saving effect is calculated (step S102). The judgment in step S102 may be made by the power saving effect calculation unit 166.

If, as a result of the judgment in step S102, the judgment is made that the power saving effect display region 180 is displayed in a portion of the display panel 102, the power saving effect calculation unit 166 subsequently acquires the ratio occupied by the power saving effect display region 180 in the screen displayed in the display panel 102 (step S103). If the power saving effect calculation unit 166 acquires the ratio occupied by the power saving effect display region 180, the difference calculation unit 172 calculates power consumption caused the display of the power saving effect in the display panel 102 by using the acquired ratio (step S104).

After the difference of power consumption caused by the display of the power saving effect being calculated by the difference calculation unit 172 in step S104, the power saving effect calculation unit 166 subsequently acquires the monitor characterization factor of the display panel 102 (step S105). After the monitor characterization factor of the display panel 102 being acquired by the power saving effect calculation unit 166 in step S105, the power saving effect calculation unit 166 calculates a difference of the power consumption caused by the display of the power saving effect in the display panel 102 by using the monitor characterization factor acquired in step S105 and the power consumption caused by the display of the power saving effect in the display panel 102 calculated in step S104 (step S106).

After the difference of the power consumption caused by the display of the power saving effect in the display panel 102 being calculated by the power saving effect calculation unit 166 in step S106, the power saving effect calculation unit 166 calculates the original power consumption of the image display apparatus 100 associated with the display of the power consumption effect in the display panel 102 by using the calculated difference (step S107). If, as a result of the judgment in step S102, the judgment is made that the power saving effect display region 180 is not displayed in a portion of the display panel 102, measured values of the power consumption of the image display apparatus 100 are used as power consumption values of the image display apparatus 100.

The power saving effect calculation method for the image display apparatus 100 according to an embodiment of the present invention has been described by using FIG. 7.

2. Conclusion

According to the image display apparatus 100 according to an embodiment of the present invention, as described above, whether any user is present in front of the image display apparatus 100 is judged depending on whether any human face is contained in an image captured by the imaging unit 104 and whether the presence of any moving body is detected by the sensor 106. By using the judgment result, power saving control to limit power consumption of the image display apparatus 100 is exercised inside the image display apparatus 100.

Then, by displaying the power saving effect in a portion of the display panel 102 as a target of the power saving control while the power saving control is exercised, the appeal to the user of the image display apparatus 100 and customers coming to the shop where the image display apparatus 100 is on sale can be increased. Then, for the display of the power saving effect, by displaying the value obtained by subtracting the power consumption value consumed by the display of the power saving effect from the actual power consumption value as the power consumption value, the original power consumption effect when the power saving effect is not displayed can be displayed.

A sequence of processing described above can be made to be performed by hardware or by software. If software is caused to perform a sequence of processing, a program constituting the software is installed from a program recording medium into a computer incorporated into dedicated hardware or a general-purpose personal computer capable of executing various functions by various programs being installed.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, when the power saving effect is displayed in the power saving effect display region 180, images captured by the imaging unit 104 are displayed as the captured image information 183 and in this case, the image display apparatus 100 may perform power saving processing by limiting to a specific person among persons contained in an image captured by the imaging unit 104 to display the power saving effect in the power saving effect display region 180. For example, when the power saving effect is displayed in the power saving effect display region 180, the person closest to the image display apparatus 100 may be selected as a target of power saving processing or the face of a specific person may be remembered to select the person as a target of power saving processing. When the power saving effect is displayed in the power saving effect display region 180, persons considered to be positioned away from the image display apparatus 100 by a predetermined distance or more from the size of a face captured by the imaging unit 104 or detected results by the sensor 106 may be excluded from power saving processing.

For example, if no human is present in front of the image display apparatus 100 for a predetermined time or longer, the image display apparatus 100 may stop displaying images in the display panel 102 or stop audio output from the speaker 108. If the presence of a moving body is detected by the imaging unit 104 or the sensor 106, the image display apparatus 100 may display a message saying that a power saving effect will be displayed in the display panel 102 to start the display of the power saving effect in the display panel 102.

For example, the presence or absence of a child or information of user's viewing positions may be displayed in the power saving effect display region 180 from images captured by the imaging unit 104 or results of moving body detection by the sensor 106. The display of such information may accompany the display of the power saving effect or may be made independently of the display of the power saving effect.

For example, the captured image information 183 displayed in the power saving effect display region 180 when the power saving effect is displayed in the display panel 102 may be images after a predetermined time (for example, 1 s) passes after being captured by the imaging unit 104. If an image immediately after being captured by the imaging unit 104 is displayed in the captured image information 183, it is difficult for the user to make sure that the power saving effect of the image display apparatus 100 is actually functioning. Therefore, when displaying the power saving effect in the display panel 102, the image display apparatus 100 may display a captured image as the captured image information 183 after a predetermined time passes after the image being captured by the imaging unit 104.

For example, the power saving effect numeric value information 182 displayed in the power saving effect display region 180 when the power saving effect is displayed in the display panel 102 may be a power saving amount calculated inside the image display apparatus 100 (for example, the system optimization processing unit 120).

INDUSTRIAL APPLICABILITY

The present invention can be applied to a display method and a display apparatus and in particular, can be applied to a display method that performs power saving processing by using captured images and moving body detection results that are captured by an imaging unit connected to a display apparatus and detected by a sensor connected to the display apparatus respectively and a display apparatus.

REFERENCE SIGNS LIST

100 Image display apparatus
102 Display panel
104 Imaging unit
106 Sensor
108 Speaker
110 Control unit
112 Image input unit
114 Image processing unit
116 Viewing state analysis unit
118 Viewing state recording unit
120 System optimization processing unit
122 System control unit
124 Optimization processing effect calculation unit
132 User viewing presence/absence analysis unit
134 User operation analysis unit
142 Panel optimization processing calculation unit
144 Speaker optimization processing calculation unit
152 Panel control unit
154 Speaker control unit
162 Viewing state acquisition unit
164 Power saving effect measuring unit
166 Power saving effect calculation unit
168 Power saving effect display unit
172 Difference calculation unit
174 Power consumption calculation unit

The invention claimed is:

1. A display method, comprising:
   capturing a first image in front of an image display surface of a display apparatus that displays a second image and detecting presence of a moving body positioned in front of the image display surface;
   deciding, by circuitry of the display apparatus, power saving control information for the display apparatus including power saving control information for the image display surface based on an analysis result of the presence or absence of a human face and a detection result of the moving body in the captured first image;
   deriving, by the circuitry, actual power saving amounts over a period of time, at least one of the actual power saving amounts being derived based on subtracting a power consumption associated with displayed power saving information from a total power consumption of the image display surface at a time the power saving information is being displayed; and
   causing, by the circuitry, display of the power saving information including the at least one of the actual power saving amounts on the image display surface, wherein
   the at least one of the actual power saving amounts is displayed in a partial region of the image display surface, and a light source used for an image display of the image display surface is turned off in regions other than the partial region.

2. The display method according to claim 1, wherein the captured first image is also displayed concurrently with the at least one of the actual power saving amounts.

3. The display method according to claim 2,
wherein the captured first image is displayed after a predetermined time passes after the first image is captured.

4. The display method according to claim 1, wherein the at least one of the actual power saving amounts is displayed as a graph chronologically representing a power consumption ratio together with a numeric value corresponding to the at least one of the actual power saving amounts.

5. The display method according to claim 1,
wherein the power saving control information is decided by limiting, among faces contained in the captured first image, to a specific face.

6. The display method according to claim 5,
wherein the specific face is a face appearing in front of others.

7. The display method according to claim 5,
wherein the specific face is a face of a person specified in advance.

8. The display method according to claim 5,
wherein when a face considered to be positioned away by a predetermined distance or more is judged to be present based on the analysis result of the presence or absence of the human face and the detection result of the moving body in the captured first image, the face is excluded from a decision target of the power saving control information.

9. The display method according to claim 1, further comprising:
determining the power consumption of the image display surface when the power saving information is displayed on the image display surface; and
separately determining the power consumption associated with the display of only the power saving information.

10. A display apparatus, comprising:
an imaging unit that captures a first image in front of an image display surface of the display apparatus that displays a second image;
a moving body detection unit that detects presence of a moving body positioned in front of the image display surface;
a power saving amount decision unit that decides power saving control information for the display apparatus including power saving control information for the image display surface based on the captured first image of the imaging unit and a detection result of the moving body of the moving body detection unit; and
a power saving amount display unit that
derives actual power saving amounts over a period of time, at least one of the actual power saving amounts being derived based on subtracting a power consumption associated with displayed power saving information from a total power consumption of the image display surface at a time the power saving information is being displayed, and
causes display of the power saving information including the at least one of the actual power saving amounts on the image display surface, wherein
the at least one of the actual power saving amounts is displayed in a partial region of the image display surface, and
a light source used for an image display of the image display surface is turned off in regions other than the partial region.

11. A display apparatus, comprising:
an imaging sensor configured to capture a first image in front of an image display surface of the display apparatus that displays a second image;
a moving body sensor that detects presence of a moving body positioned in front of the image display surface; and
circuitry configured to
decide power saving control information for the display apparatus including power saving control information for the image display surface based on the captured first image of the imaging sensor and a detection result of the moving body of the moving body sensor,
derive actual power saving amounts over a period of time, at least one of the actual power saving amounts being derived based on subtracting a power consumption associated with displayed power saving information from a total power consumption of the image display surface at a time the power saving information is being displayed, and
cause display of the power saving information including the at least one of the actual power saving amounts on the image display surface, wherein
the at least one of the actual power saving amounts is displayed in a partial region of the image display surface, and
a light source used for an image display of the image display surface is turned off in regions other than the partial region.

12. The display apparatus according to claim 11, wherein the captured first image is also displayed concurrently with the at least one of the actual power saving amounts.

13. The display apparatus according to claim 12,
wherein the captured first image is displayed after a predetermined time passes after the first image is captured.

14. The display apparatus according to claim 11, wherein the at least one of the actual power saving amounts is displayed as a graph chronologically representing a power consumption ratio together with a numeric value corresponding to the at least one of the actual power saving amounts.

15. The display apparatus according to claim 11,
wherein the power saving control information is decided by limiting, among faces contained in the captured first image, to a specific face.

16. The display apparatus according to claim 15
wherein the specific face is a face appearing in front of others.

* * * * *